US008736895B2

(12) United States Patent
Yamaguchi et al.

(10) Patent No.: US 8,736,895 B2
(45) Date of Patent: May 27, 2014

(54) TAPE PRINTING APPARATUS

(71) Applicant: Brother Kogyo Kabushiki Kaisha, Nagoya (JP)

(72) Inventors: Kishiro Yamaguchi, Kakamigahara (JP); Tsutomu Kato, Nagoya (JP); Susumu Murata, Konan (JP); Ryosuke Ishikawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 73 days.

(21) Appl. No.: 13/627,824

(22) Filed: Sep. 26, 2012

(65) Prior Publication Data

US 2013/0021622 A1 Jan. 24, 2013

Related U.S. Application Data

(63) Continuation-in-part of application No. PCT/JP2011/072346, filed on Sep. 29, 2011.

(51) Int. Cl.

*H04N 1/21* (2006.01)
*G06K 15/00* (2006.01)
*H04N 11/00* (2006.01)
*B41J 5/40* (2006.01)
*B41J 11/44* (2006.01)

(52) U.S. Cl.

USPC ........ 358/1.6; 358/304; 358/1.12; 400/615.2; 400/621; 400/62; 400/76

(58) Field of Classification Search

USPC ......................... 358/1.6; 400/615.2, 582, 583
See application file for complete search history.

(56) References Cited

U.S. PATENT DOCUMENTS

| | | | | |
|---|---|---|---|---|
| 7,121,751 | B2 * | 10/2006 | Harada et al. | 400/615.2 |
| 7,284,920 | B2 * | 10/2007 | Waldal | 400/76 |
| 7,314,321 | B2 * | 1/2008 | Kurashina | 400/76 |
| 7,322,762 | B2 * | 1/2008 | Murata et al. | 400/615 |
| 7,597,493 | B2 * | 10/2009 | Mori et al. | 400/621 |

(Continued)

FOREIGN PATENT DOCUMENTS

| | | |
|---|---|---|
| JP | 11-277824 A | 10/1999 |
| JP | 2004-181843 A | 7/2004 |
| JP | 2007-048267 A | 2/2007 |

OTHER PUBLICATIONS

Office Action issued in Japanese Application No. 2010-219218 on Oct. 8, 2013.

(Continued)

*Primary Examiner* — Akwasi M Sarpong
(74) *Attorney, Agent, or Firm* — McCarter & English, LLP

(57) ABSTRACT

A tape printing apparatus compares a back-side background region of print data to be previously printed and a front-side background region of print data to be subsequently printed upon receipt of plural print data including background. If they are different, the tape printing apparatus creates a front-side color mixture tolerance region and a back-side color mixture tolerance region based on the front-side background region and the back-side background region, respectively, so that the front-side color mixture tolerance region and the back-side color mixture tolerance region are arranged continuously. The apparatus sets cut positions at a front edge border and a back edge border of each print data and cut the tape off at those portions while carrying out full-color print on the tape based on respective print data.

12 Claims, 9 Drawing Sheets

(56) References Cited

U.S. PATENT DOCUMENTS

| | | | | |
|---|---|---|---|---|
| 7,686,527 | B2 * | 3/2010 | Harada et al. | 400/621 |
| 8,092,104 | B2 * | 1/2012 | Buzuev et al. | 400/76 |
| 2006/0039738 | A1 * | 2/2006 | Murata et al. | 400/615.2 |
| 2007/0006963 | A1 * | 1/2007 | Bever | 156/213 |
| 2007/0013959 | A1 * | 1/2007 | Miwa | 358/304 |

OTHER PUBLICATIONS

International Preliminary Search Report issued in PCT/JP2011/072346 on Apr. 18, 2013.

International Search Report of PCT/JP2011/072346 dated Nov. 1, 2011.

* cited by examiner

TAPE PRINTING APPARATUS

CROSS-REFERENCE TO RELATED APPLICATIONS

The present application is a continuation-in-part application based upon and claims the benefit of the prior PCT International Patent Application No. PCT/JP2011/072346 filed on Sep. 29, 2011, the disclosure of which is herein incorporated by reference in its entirety.

TECHNICAL FIELD

The present disclosure relates to a tape printing apparatus capable of cutting a long-tape-like recording medium into each piece of a print result based on each print data when full-color print is continuously carried out on the long-tape-like recording medium with respect to plural print data.

BACKGROUND ART

There have conventionally been known printing apparatuses capable of carrying out so-called borderless print. In borderless print, plural print data each of which includes a background content with respect to the entirety of a print region are continuously printed on a long tape of recording medium in full color or in black and white and subsequently print results of the plural print data are cut off one by one.

In this connection, in a case where two print data to be continuously printed have different expression patterns (e.g., background color) at an adjoining portion where edges of the two print data adjoin to each other, print of a background pattern of print data first printed out can possibly affect print of a background pattern of print data next printed out. For instance, background color of the print data next printed out may be affected by background color of the print data first printed out at the adjoining portion and color mixture may occurs to the adjoining portion, especially on the side of the background color belonging to the print data next printed out. In that case, the print result of the print data next printed out contains color mixture at the border of the print result of the print data first printed out. Therefore, one of the print results is different from a print result a user has initially desired.

There has also conventionally been known a printing apparatus configured to compare an image content of print data to be first printed out and that of print data to be next printed out and to cut off a roll sheet at the adjoining portion of those two images to be printed out if both image contents are the same. If not the same, the printing apparatus is configured to arrange a margin region between them and to cut off the roll sheet at an inner position of a printed region by predetermined length with reference to a border of the margin region and the printed region.

If image contents of successive two print data are the same, the above-mentioned conventional printing apparatus is configured to cut the roll sheet at print border of the successive two print data. Thereby, print results based on the respective print data can be served in a form of borderless print. Even if not the same, the conventional printing apparatus is configured to arrange a margin region between the two print data so as to avoid color mixture at the print border of those. Thereby, print results based on the respective print data can be served in a form of borderless print without color mixture.

In the case where image contents of successive two print data are not the same, the conventional printing apparatus is thus configured to arrange a margin region between the two print data and to cut off the roll sheet at the inner position in the printed region by predetermined length with reference to the border of the margin region and the printed region. Therefore, in that case, print results based on the respective print data can be served in a form of borderless print, however, resultant size after cut off is smaller than user's desired size.

SUMMARY

The present disclosure has been made to overcome the above problems and the object of the disclosure is to provide a tape printing apparatus capable of cutting a long-tape-like recording medium into each piece of a print result based on each print data at desired size without occurrence of color mixture in a print result when full-color print is continuously carried out on the long-tape-like recording medium with respect to plural print data.

A tape printing apparatus, directed to the disclosures for achieving the above, object, comprises a print data inputting unit that allows an input of print data containing a background content that involves designation of a background color to be used for entirety of a print region; a printing unit that carries out full-color print on a tape having long length in accordance with the print data inputted with the print data inputting unit; and a cutting unit that cuts the tape along width direction thereof, wherein the tape printing apparatus further includes: a data accepting unit that accepts an input of first print data and an input of second print data both inputted by the print data inputting unit, the first print data being data to be firstly printed out by the printing unit and the second print data being data to be printed out by the printing unit next to the first print data; a difference detecting unit that detects whether or not there is difference between a background content of a first region directed to the first print data and a background content of a second region directed to the second print data, the first region being a predetermined range including a back edge border to be printed out last in the first print data by the printing unit and the second region being a predetermined range including a front edge border to be printed out first in the second print data by the printing unit; a color-mixture-tolerance-region generating unit that generates a first color mixture tolerance region and a second color mixture tolerance region in a case where the difference detecting unit detects difference between the background content of the first region and the background content of the second region, the first color mixture tolerance region being a region to be printed out immediately after the back edge border of the first print data in accordance with the background content of the first region and the second color mixture tolerance region being a region to be printed out immediately before the front edge border of the second print data in accordance with the background content of the second region; a cut position setting unit that sets on the tape cut positions where the tape is cut by the cutting unit, the cut positions being a front edge border and the back edge border of the first print data and the front edge border and a back edge border of the second print data; a print control unit that controls the printing unit so as to print out on the tape in order of the first print data, the first color mixture tolerance region, the second color mixture tolerance region and the second print data; and a cut control unit that controls the cutting unit so as to cut at the cutting positions set by the cut position setting unit, the tape on which the printing unit has carried out print.

DETAILED DESCRIPTION

There will be described on a tape printing apparatus 1 embodying a tape printing apparatus of the present disclosure in detail by referring to drawings. Firstly, overall configuration of the tape printing apparatus 1 directed to the present embodiment will be described by referring to FIG. 1. The tape printing apparatus 1 connected to a personal computer 80 (refer to FIG. 5) is used for creating a desired label in accordance with print data P (refer to FIG. 8) inputted with the personal computer 80.

Figure 1:
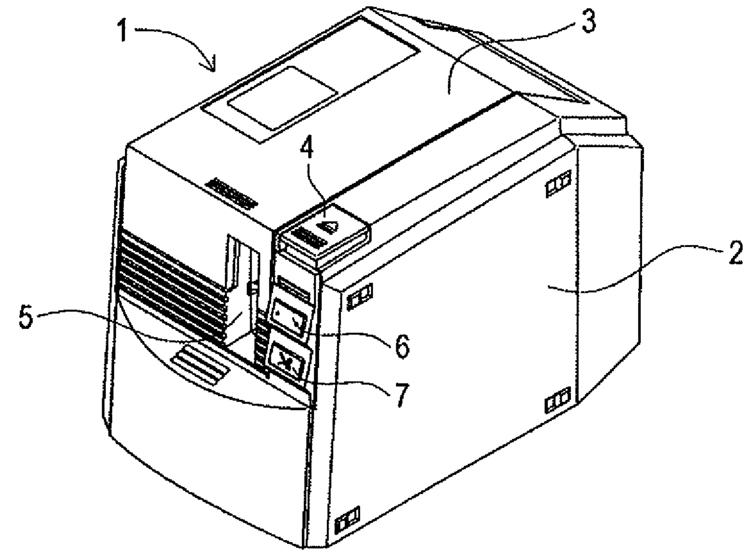
FIG. 1 is a perspective view for illustrating appearance of a tape printing apparatus directed to a present embodiment.

As shown in FIG. 1, the tape printing apparatus 1 is comprised of a main body 2 which accommodates an inner unit 10. On a top face of the main body 2, there is attached a lid 3 which is openable and closable. In FIG. 1, the lid 3 is attached so as to be pivotable with reference to a right end portion of the main body 2. The lid 3 is always urged in an openable direction by an urging member such as spring, etc. Upon depression of an open-close button 4 arranged at a side portion on the top face of the main body 2, the lid 3 and the main body 2 are unlocked and the lid 3 is released from the locked state by the urging member.

The main body 2 includes a tape ejecting port 5 at a front side wall thereof (left side in FIG. 1). The tape ejecting port 5 ejects a tape T on which print has been carried out in the main body 2. The main body 2 further includes a power button 6 and a cutter driving button 7 below the open-close button 4. The power button 6 is operated for turning on and off the power of the tape printing apparatus 1. The cutter driving button 7 is operated for cutting off the tape T by user's desired length with a cutter unit 25 (refer to FIG. 2 through FIG. 4) which constitutes the inner unit 10. The details of the cutter unit 25 installed in the tape printing apparatus 1 will be described later.

Next, the inner unit 10 of the tape printing apparatus 1 will be described in detail by referring to FIG. 2 through FIG. 4. As described in the above, the inner unit 10 is accommodated in the main body 2 and constituted by mounting a cassette housing portion 15, a printer unit 20, a cutter unit 25, a tape ejector unit 40, etc. to a unit frame 11.

Figure 2:
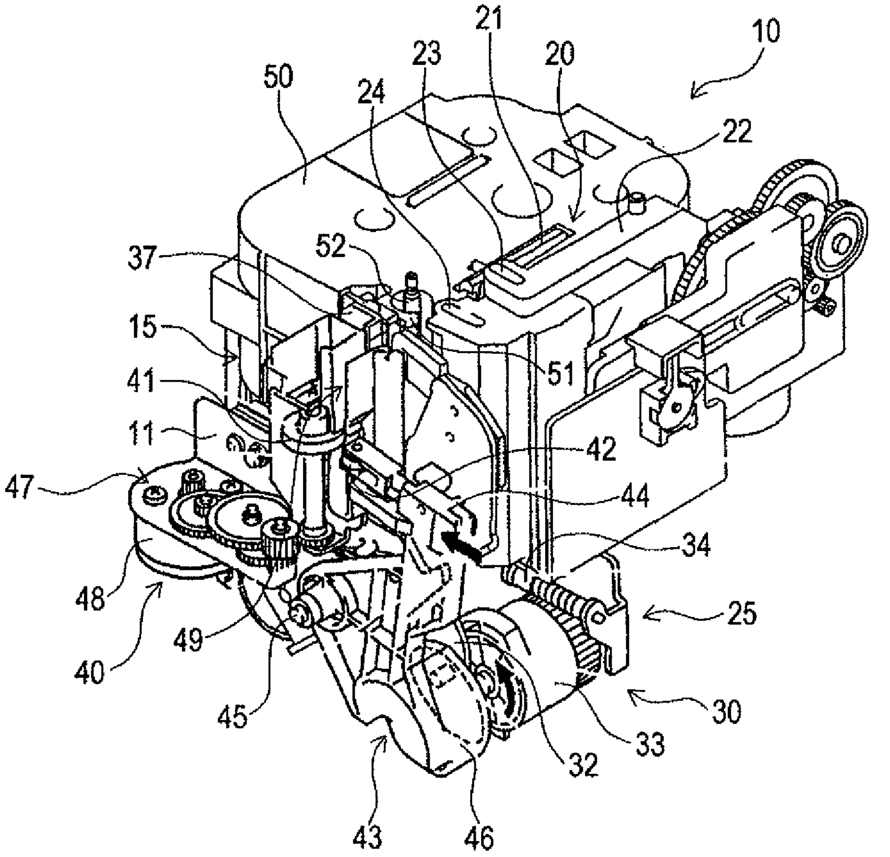
FIG. 2 is a perspective view of an inner unit of the tape printing apparatus.
Figure 4:
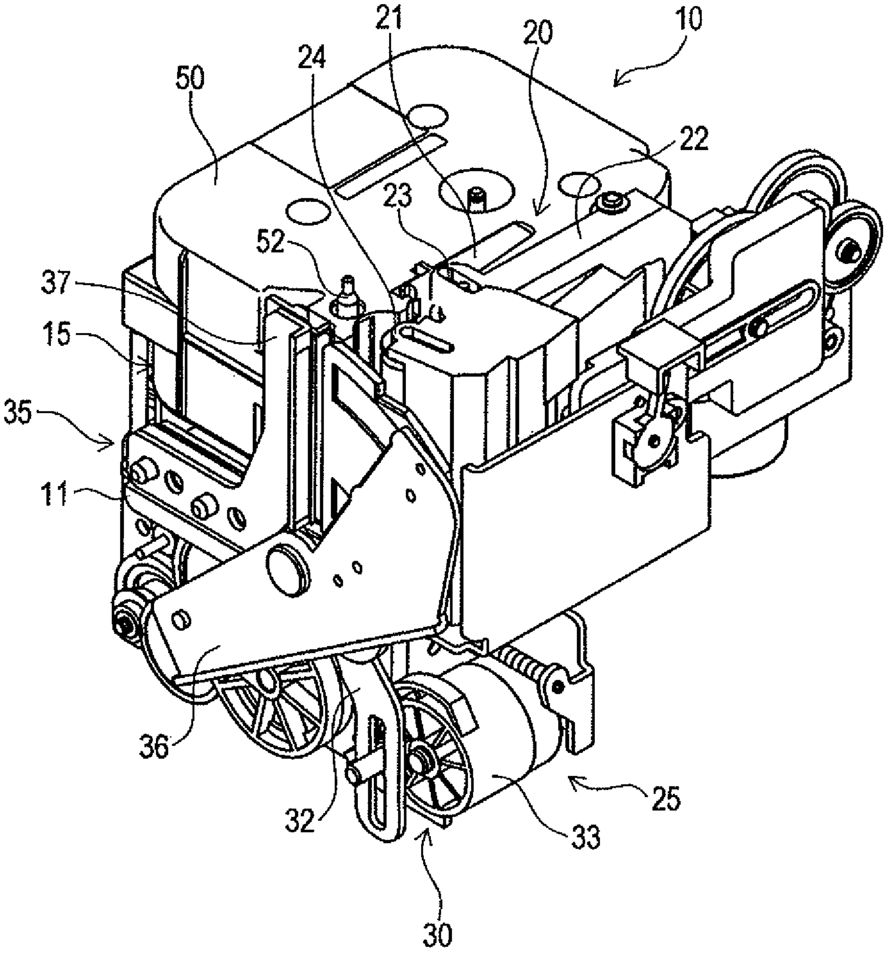
FIG. 4 is a perspective view of a half-cut unit of the tape printing apparatus.

The cassette housing portion 15 is a portion to house a tape cassette 50 and arranged at an upper portion of the inner unit 10 (refer to FIG. 2 and FIG. 4). As recording medium for the tape printing apparatus 1, the tape cassette 50 contains a tape T inside. Since the cassette housing portion 15 is located below the lid 3, a user can place the tape cassette 50 in the cassette housing portion 15 by opening the lid 3. It is to be noted that the tape cassette 50 is placed in the cassette housing portion 15 so that width of the tape T to be ejected from the tape ejecting port 5 should stand perpendicular to the cassette housing portion 15.

The printer unit 20 is a unit for carrying out print on the tape T and comprised of a thermal head 21, a roller holder 22, a platen roller 23 and a tape pressing roller 24. The thermal head 21 is arranged upright on the cassette housing portion 15 and comprised of plural heating elements aligned along width direction of the tape T. In collaboration with the platen roller 23, the thermal head 21 carries out print on the tape T in accordance with print data P.

At the cassette housing portion 15, the roller holder 22 is arranged in front of the tape cassette 50 (lower right side in FIG. 3) so as to be pivotable between a print position and a release position. The roller holder 22 serves to support the platen roller 23 and the tape pressing roller 24 in a rotatable manner.

As described in, the above, the platen roller 28 is rotatably supported by the roller holder 22 and located at a side to face a surface of the thermal head 21 made of the plurality of heating elements. Accordingly, the platen roller 23 presses the thermal head 21 when the roller holder 22 is located at the print position.

As described in the above, the tape pressing roller 24 is rotatably supported by the roller holder 22, and driven by a conveying motor 66 and a gear unit (not shown) which collaboratively rotate the tape pressing roller 24. When the roller holder 22 is located at the print position, the tape pressing roller 24 comes to press a tape conveying roller 52 rotatably arranged at the vicinity of a tape ejecting portion 51 of the tape cassette 50 placed in the cassette housing portion 15.

Accordingly, as long as the roller holder 22 is shifted and placed at the print position, the tape printing apparatus 1 is capable of conveying the tape T in tape ejecting direction, i.e., toward the tape ejecting port 5 (leftward in FIG. 3) in concurrent with print on the tape T with the thermal head 21.

The cutter unit 25 is a unit for cutting off the tape T on which print has been carried out by the printer unit 20 and comprised of a full-cut unit 30 and a half-cut unit 35. The full-cut unit 30 is a unit for thoroughly cutting off the tape T (refer to FIG. 6). The half-cut unit 35 is a unit for cutting off the tape T leaving a release sheet thereof uncut.

The full-cut unit 30 is located upstream of the tape ejecting port 5 with reference to the tape ejection direction and arranged in the vicinity of the unit frame 11. The full-cut unit 30 is comprised of a fixed blade 31, a movable blade 32, a cutting operation mechanism portion 33 and a cutter motor 34 (refer to FIG. 3). The fixed blade 31 is fixed to the unit frame 11 constituting the inner unit 10 and used when thoroughly cutting off the tape T in width direction in collaboration with the movable blade 32.

The movable blade 32 is substantially V-shaped and comprised of a blade portion at its cutting side and a handle portion at the other side of the blade portion. The movable blade 32 is supported with a fulcrum shaft on the unit frame 11 so as to be able to rotate with reference to a shaft hole formed in a bent portion (a boundary portion of the blade portion and the handle portion). Accordingly, the movable blade 32 is configured to move toward the fixed blade 31 so as to cut off the tape T in collaboration of the fixed blade 31.

The cutter motor 34 gives driving force to the cutting operation mechanism portion 33 when driven. The cutting operation mechanism portion 33 transmits driving force of the cutter motor 34 to the handle portion of the movable blade 32 so as to move the movable blade 32 around the fulcrum shaft hole. Thereby, the tape T is cut off by collaboration of the movable blade 32 and the fixed blade 31.

Figure 3:
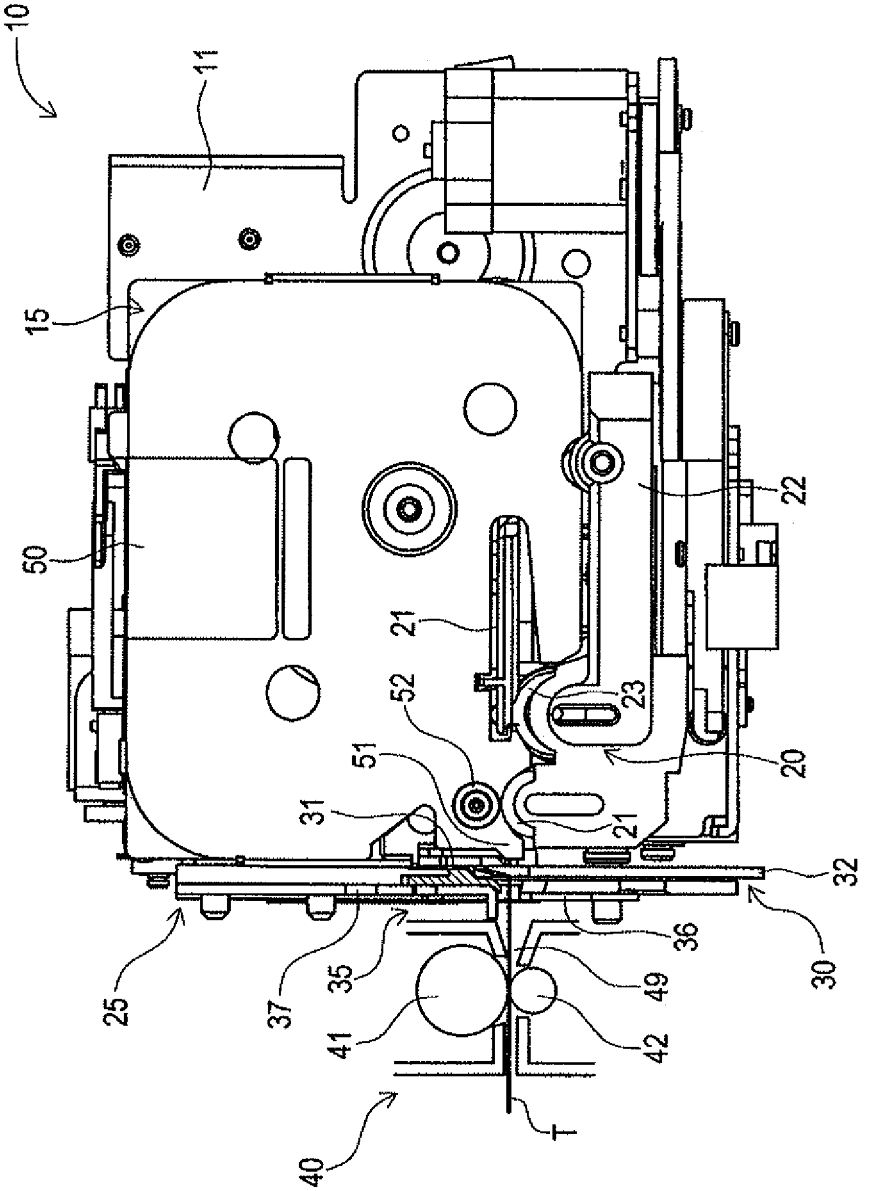
FIG. 3 is a top view of the inner unit of the tape printing apparatus.

The half-cut unit 35 is located downstream of the full cut unit 30 with reference to the tape ejection direction and arranged inside the main body 2 (refer to FIG. 3). The half-cut unit 35 is comprised of a half cutter 36 and a cradle 37. Specifically, the half-cut unit 35 is located between the full-cut unit 30 and a tape ejecting mechanism 40.

As shown in FIG. 4, the half cutter 36 is movably arranged at the side of the movable blade 32 so as to move toward the fixed blade 31 when the cutter motor 34 is driven. The cradle 37 fixed to the fixed blade 31 is arranged at a position facing the half cutter 36. Of the cradle 37, an end portion facing the to-be-ejected tape T is bent so as to be parallel with the tape T. Accordingly, when the half cutter 36 is pressed against the cradle 37 with the tape T placed therebetween, a substrate and an adhesive layer of the tape T are cut off but a release sheet thereof is left uncut (i.e., half cut).

As shown in FIG. 3, the tape ejecting mechanism 40 is arranged in the vicinity of the tape ejecting port 5 and configured to forcedly eject from the tape ejecting port 5 the tape T cut at the cutter unit 25. The tape ejecting mechanism 40 is comprised of a drive roller 41, a press roller 42, a press operation mechanism portion 43, an ejection operation mechanism portion 47 and a tape ejector motor 48.

Inside the tape ejecting port 5, there is a tape ejecting path 49 formed of wall surfaces disposed at predetermined interval (refer to FIG. 3). The tape ejecting path 49 serves to guide to the tape ejecting port 5 the tape T to be ejected by the tape ejecting mechanism 40.

The drive roller 41 is arranged so as to face the tape ejecting path 49, and rotated so as to eject the tape T from the tape ejecting port when driving force of the tape ejector motor 48 is duly transmitted via the ejection operation mechanism portion 47. Inside the press operation mechanism portion 48, the press roller 42 is arranged so as to face the drive roller 41 and configured to press the tape T against the drive roller 41 along operation of the press operation mechanism portion 43.

The press operation mechanism portion 43 is configured to move the press roller 42 toward the drive roller 41 to make the press roller 42 press the tape T or release the press of the tape T. The press operation mechanism portion 43 is comprised of a roller support holder 44, a holder support shaft 45 and a drive transmission portion 46. The roller support holder 44 is configured to hold the press roller 42 at a predetermined position in a rotatable manner and supported by the holder support shaft 45 so as to able to rotate within predetermined range (refer to FIG. 2). The drive transmission portion 46 serves to drive the press operation mechanism portion 43 along operation of the cutter unit 25. Specifically, via the drive transmission portion 46, the roller support holder 44 is rotated counterclockwise with respect to the holder support shaft 45 when the cutting operation mechanism portion 33 is operated. Thereby, the press roller 42 presses the tape T against the drive roller 41. In a case where the cutting operation mechanism portion 33 is further operated, the roller support holder 44 is rotated in inverse direction (i.e., clockwise) with reference to the holder support shaft 45. Thereby the press roller 42 comes separate from the tape T.

The ejection operation mechanism portion 47 is configured to rotate the drive roller 41 so as to eject the tape T along press-release operation of the press operation mechanism portion 43. The ejection operation mechanism portion 47 is comprised of a tape ejector motor 48 and row of gears. The tape ejector motor 48 transmits the drive roller 41 its driving force via the row of gears so as to drive and rotate the drive roller 41 in predetermined direction. Specifically, at the ejection operation mechanism portion 47, the tape ejector motor 48 is driven so as to rotate the drive roller 41 in the predetermined direction in a state that the tape T is pressed against the drive roller 41 by the press roller 42. Thereby, the tape T clamped by the drive roller 41 and the press roller 42 is forcedly ejected from the tape ejecting port 5.

Figure 5:
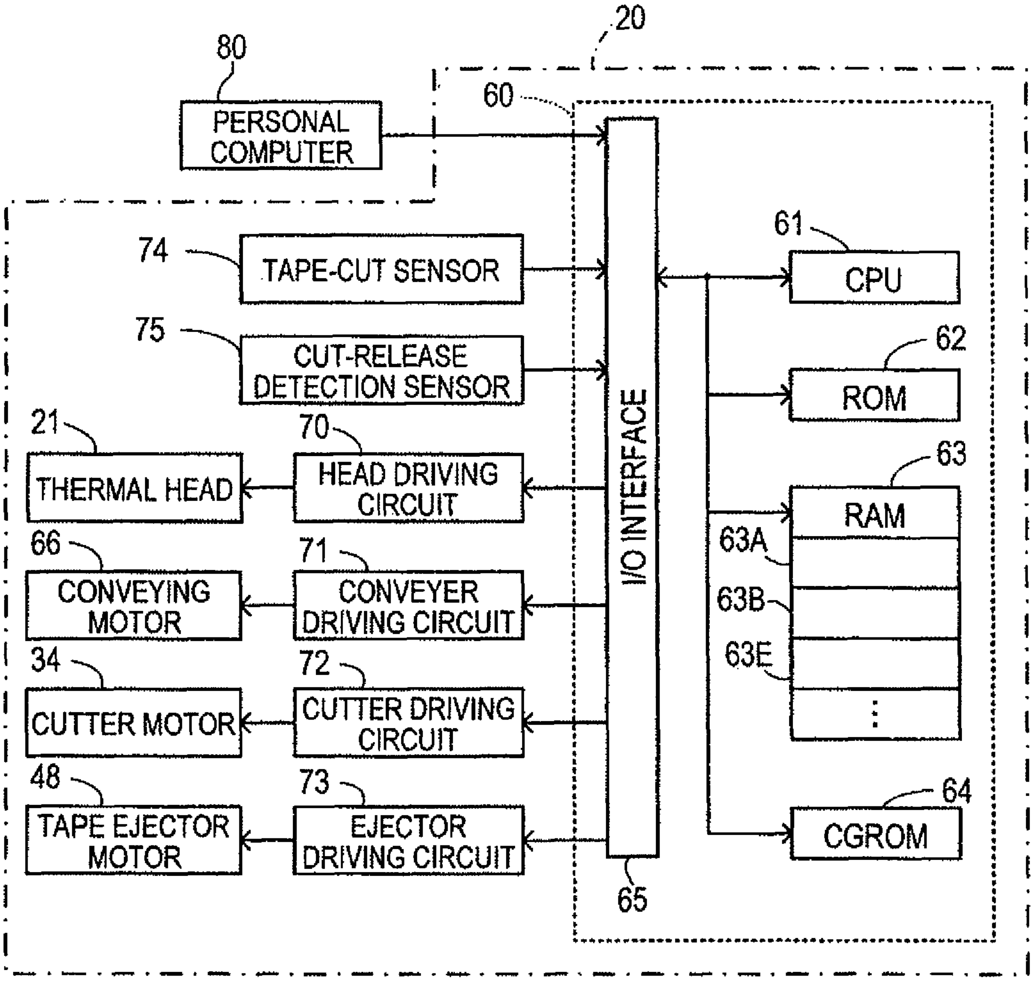
FIG. 5 is a block diagram for illustrating control system of the tape printing apparatus.

Next, there will be described on a control system of the tape printing apparatus 1 in detail by referring to FIG. 5. As shown in FIG. 5, the tape printing apparatus 1 includes a control circuit unit 60. The control circuit unit 60 is the center of comprehensive control of the tape printing apparatus 1, and comprised of a CPU 61, a ROM 62, a RAM 63, a CGROM 64 and an input/output interface 65.

The CPU 61 carries out various arithmetic processes in accordance with various control programs stored in the ROM 62 so as to control the printer unit 20, the cutter unit 25, the tape ejecting mechanism 40, etc. The ROM 62 stores various control programs essential to comprehensive control of the tape printing apparatus 1 in addition to to-be-later-described main control program (refer to FIG. 7), and different data treatment process program (refer to FIG. 11). Details of the ROM 62 will be described later.

The RAM 63 includes a text memory 63A, a print buffer 63B, a parameter memory area 63E, etc. The text memory 63A stores document data inputted with the personal computer 80. The print buffer 63B stores dot pattern data regarding dot patterns used for print. The parameter memory area 63E stores various operation data.

A CGROM 64 stores print dot pattern data of characters such as alphabets, signs and the like wherein the dot pattern data of characters are classified under font styles (e.g., Gothic styles, Mincho styles) and each character of each font style has varieties of character sizes and is associated with code data. The CGROM 64 also stores background pattern data for printing background images. The background pattern data is inclusive of gradation expressions and patterns expressed with dots and used at a color-mixture-tolerance-region generating process (S11).

Via the input/output interface 65, the CPU 61 is connected with a head driving circuit 70, a conveyer driving circuit 71, a cutter driving circuit 72, an ejector driving circuit 73, a tape-cut sensor 74 and a cut-release detection sensor 75. The head driving circuit 70 is used for drive control (energization control) of the thermal head 21. The conveyer driving circuit 71 is used for drive control of a conveying motor 66. The cutter driving circuit 72 is used for drive control of the cutter motor 34. The ejector driving circuit 73 is used for drive control of the tape ejector motor 48. The tape-cut sensor 74 serves to detect that the cutter unit 25 finishes cutting the tape T. The cut-release detection sensor 75 serves to detect that the movable blade 32 and the half cutter 36 of the cutter unit 25 return to their respective release positions.

Via the input/output interface 65, the CPU 61 is also connected with the personal computer 80. When print data P is inputted with the personal computer 80, the CPU 61 stores the print data P in the RAM 63 so that print can be carried out on the tape T in accordance with the print data P.

Figure 6:
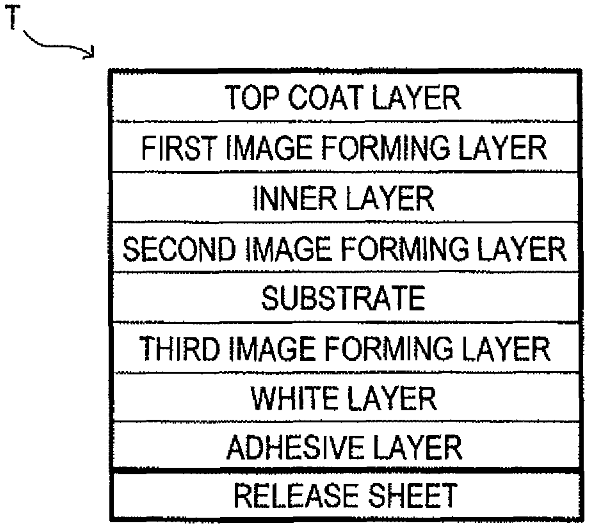
FIG. 6 is a diagram for illustrating configuration of a tape used for the tape printing apparatus.

Next, there will be described on configuration of the tape T used for the tape printing apparatus 1 of the present embodiment by referring to FIG. 6. As shown in FIG. 6, the tape T is comprised of a label tape and a release sheet. The label tape is constituted by laminating, in the following order from a printing surface thereof: a top coat layer; a first image forming layer, an inner layer; a second image forming layer, a substrate, a third image forming layer, a white layer; and an adhesive layer. Thermal print is carried out on the printing surface of the label tape when heating elements of the thermal head 21 get contact on the printing surface.

The first image forming layer includes leuco pigment and predetermined developer so as to make yellow come out with density which reflects heat energy amount given by the heating elements of the thermal head 21. The second image forming layer includes leuco pigment and predetermined developer so as to make magenta come out with density which reflects heat energy amount given by the heating elements of the thermal head 21. The third image forming layer includes leuco pigment and predetermined developer so as to make cyan come out with density which reflects heat energy amount given by the heating elements of the thermal head 21. Detailed configuration of the label tape has been publicly known by publications, e.g., JP Laid-open Patent Application Publication No. 2008-006830. Accordingly, description on the configuration of the label tape will be omitted. To sum up, the tape printing apparatus 1 realizes full-color print on the tape T by controlling heat energy amount to be transferred to the tape T through each heating element of the thermal head 21.

Figure 7:
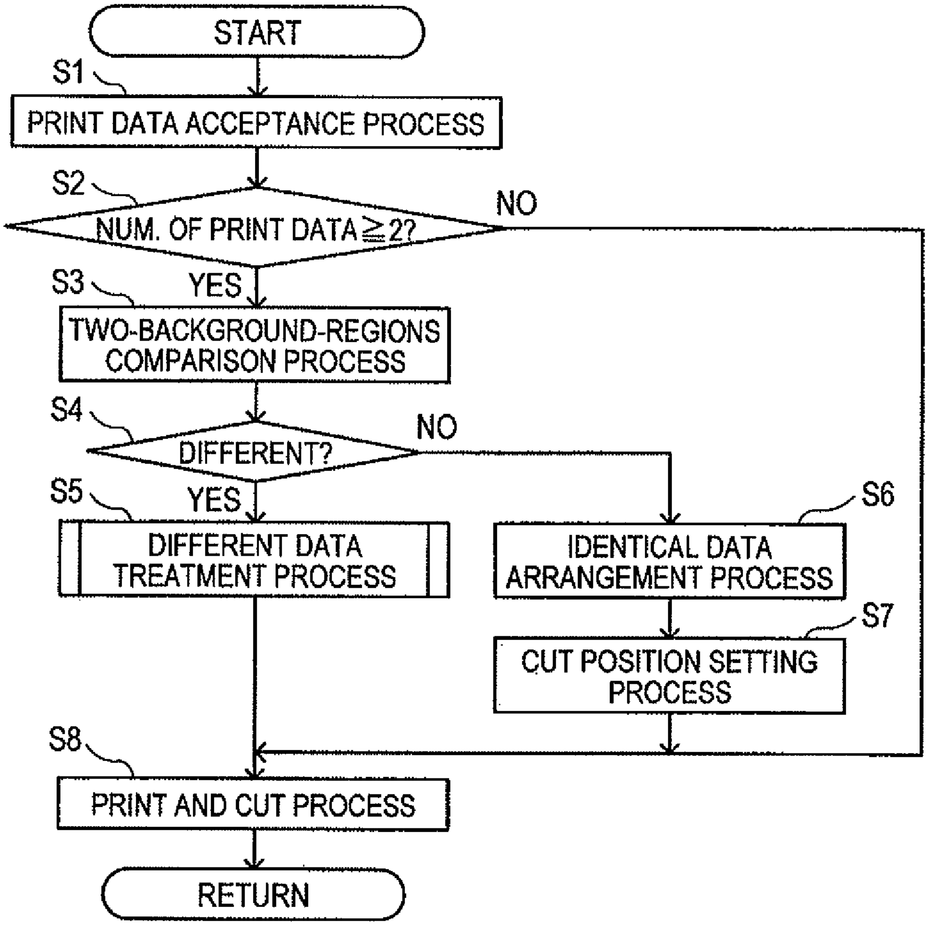
FIG. 7 is a flowchart of a main control program of the tape printing apparatus.

Next, there will be described on a main control program executed for the tape printing apparatus 1 by referring to FIG. 7. As shown in FIG. 7, when the main control program is initiated, the CPU 61 firstly executes a print data acceptance process (S1) in which the CPU 61 accepts an input of print data P transmitted from the personal computer 80 along with a print execution instruction and subsequently stores the print data P in the RAM 63. After completion of the print data acceptance process (S1), the CPU 61 shifts the process to S2.

Figure 8:
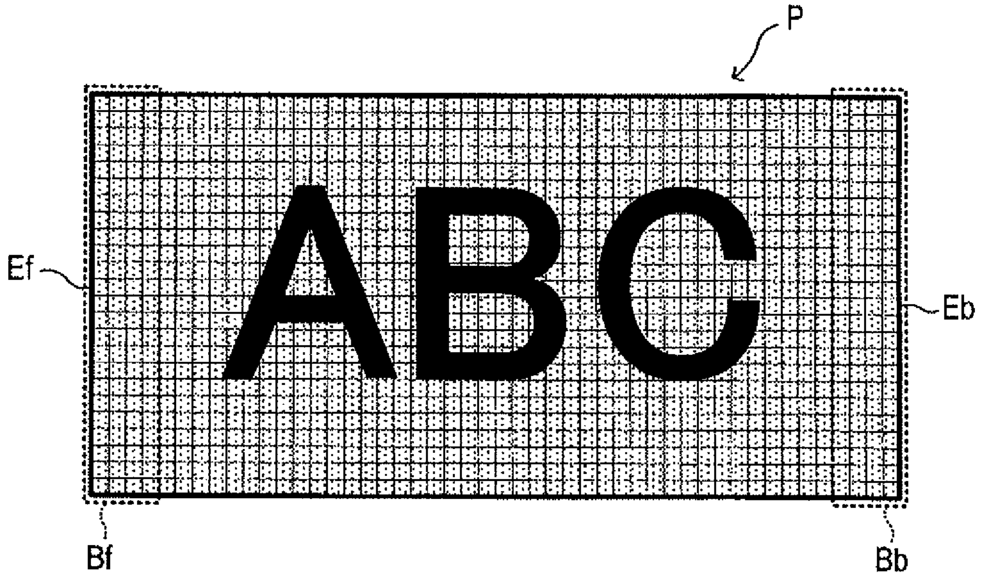
FIG. 8 is a diagram for exemplarily illustrating configuration of print data.

Here will be descried on data configuration of print data P to be accepted at the print data acceptance process (S1) in detail by referring to FIG. 8. As shown in FIG. 8, the print data P is comprised of plural dot data. Each dot data corresponds to a single heating element of the thermal head 21 and heat energy amount the said heating element should transfer to the tape T is initially set. The tape printing apparatus 1 realizes full-color print on the tape T by controlling heat energy amount to be transferred to the tape T through each heating element of the thermal head 21.

The print data P includes text and background. As shown in FIG. 8, the background means an expression pattern to be printed in accordance with the print data P over the entirety of the print region. More specifically, background color or background pattern (e.g., dot pattern, stripes) to be printed in accordance with the print data P corresponds to the background. For instance, in the case of the print data P shown in FIG. 8, at initial setting, the text "ABC" and the background are to be printed in black and magenta (red), respectively.

The print data P is printed per each line data consisting of a line of dot data arranged vertically in a line in FIG. 8. Specifically, the print data P is printed by the printer unit 20 in order from the left side and terminated when the right end portion is printed on the tape T. In the present embodiment, of the print data P, the line data first to be printed (far left line data in FIG. 8) and the line data last to be printed (far right line data in FIG. 8) are respectively termed as "front edge border Ef" and "back edge border Eb". Further, of the print data P, a region consisting of the front edge border Ef and line data directed to a predetermined number of lines to be to be printed subsequent to the front edge border Ef is termed as "front-side background region Bf" and a region consisting of the back edge border Eb and line data directed to a predetermined number of lines to be printed prior to the back edge border Eb is termed as "back-side background region Bb".

In FIG. 8 or others, the print data P is illustrated as including the text of "ABC". The print data P, however, is not restricted to this example. The print data P may be comprised of only background, for instance, may be comprised of dot data corresponding to mono-colored background of red or dot data expressing repetition of certain pattern to make up background pattern.

At S2, the CPU 61 determines whether or not the number of print data P inputted with the personal computer 80 and accepted at the data acceptance process (S1) is larger than 1. In a case where the number of print data P accepted is larger than 1 (S2: YES), the CPU 61 shifts the process to S3. In a case where the number of print data P accepted is 1 (S2: NO), the CPU 61 shifts the process to S8.

In the following description, among plural print data P accepted at the print data acceptance process (S1), data first to be printed out on the tape T is termed as "first print data Pa". Further, data to be printed out next to the first print data Pa is termed as "second print data Pb" and data to be printed out next to the second print data Pb is termed as "third print data Pc".

At S8, the CPU 61 executes a "two-background-regions comparison process" with respect to the plural print data P accepted at the print data acceptance process (S1). At the two-background-regions comparison process (S3), among the plural print data P, the CPU 61 compares background configuration of a back-side background region Bb directed to certain print data P (for instance, first print data Pa) and that of a front-side background region Bf directed to another print data P to be printed out next to the certain print data P (for instance, second print data Pb). After completion of the two-background-regions comparison process (S3), the CPU 61 shifts the process to S4.

Figure 9:
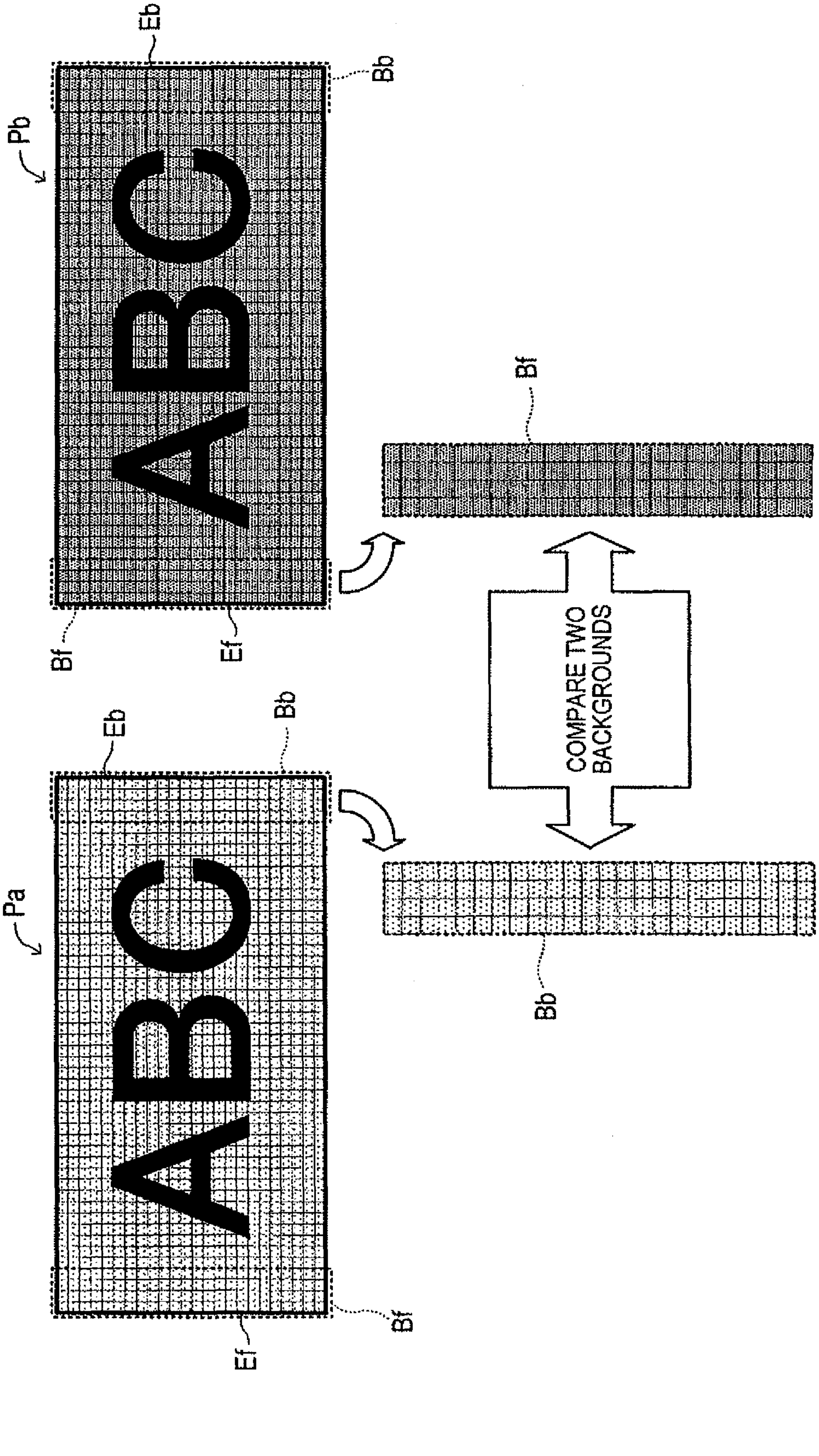
FIG. 9 is a diagram for illustrating details of a two-backgrounds comparison process.

Here will be described on detailed process contents of the two-background-regions comparison process (S3) by referring to FIG. 9. Here will be taken a specific example to compare first print data Pa expressing mono-colored background of "magenta" and second print data Pb expressing mono-colored background of "yellow".

Shifting the process to the two-background-regions comparison process (S3), the CPU 61 firstly extracts the back-side background region Bb directed to the first print data Pa. Specifically, by extracting line data of several lines inclusive of the back edge border Eb from the first print data Pa, the CPU 61 extracts the back-side background region Bb directed to the first print data Pa. In this case, the back-side background region Bb directed to the first print data Pa is a dot data to express complete mono-color of magenta. Next, the CPU 61 extracts the front-side background region Bf directed to the second print data Pb. Specifically, by extracting line data of several lines inclusive of the front edge border Ef from the second print data Pb, the CPU 61 extracts the front-side background region Bf directed to the second print data Pb. In this case, the front-side background region Bf directed to the second print data Pb is a dot data to express complete mono-color of yellow.

After that, the CPU 61 compares the back-side background region Bb directed to the first print data Pa and the front-side background region Bf directed to the second print data Pb. In the example shown in FIG. 9, the one is magenta and the other is yellow. Therefore, the CPU 61 determines that the configuration of the back-side background region Bb directed to the first print data Pa and that of the front-side background region Bf directed to the second print data Pb are different and subsequently stores the comparison result in the RAM 63.

Provided that the front-side background region Bf directed to the second print data Pb is dot data to express complete mono-color of magenta, for instance, the CPU 61 determines that the configuration of the back-side background region Bb directed to the first print data Pa and that of the front-side background region Bf directed to the second print data Pb coincide with each other.

Shifting the process to S4, the CPU 61 determines whether or not the comparison result indicates difference between the back-side background region Bb directed to the first print data Pa and the front-side background region Bf directed to the second print data Pb, based on the processing result at the two-background-regions comparison process (S3). In a case where the comparison result indicates difference (S4: YES), the CPU 61 shifts the process to S5. In a case where the comparison result contrarily indicates coincidence (S4: NO), the CPU 61 shifts the process to S6.

At S5, the CPU 61 executes a different data treatment process. At the different data treatment process (S5), the CPU 61 executes a different data treatment process program (refer to FIG. 11) so as to carry out arrangement of plural print data having been inputted with the personal computer 80, generation of a color-mixture tolerance region to be described later, setting of a cut position, etc. Details about the different data treatment process will be described later by referring drawings. After completion of the different data treatment process (S5), the CPU 61 shifts the process to S8.

At S6, the CPU 61 executes an identical data arrangement process with respect to two print data P detected to be identical background region contents at two-background-regions comparison process (S3), namely, coincidence of a back-side background region Bb directed to the one print data P and a front-side background region Bf of the other print data P. For instance, in a case where background configuration of the back-side background region Bb of the first print data Pa coincides with that of the front-side background region Bf of the second print data Pb, the CPU 61 arranges the first print data Pa and the second print data Pb so that the back edge border Eb of the first print data Pa and the front edge border Ef of the second print data Pb adjoin to each other. After completion of the identical data arrangement process (S6), the CPU 61 shifts the process to S7.

Shifting the process to S7, the CPU 61 executes a cut position setting process with respect to the two print data P arranged at the identical data arrangement process (S6). At the cut position setting process (S7), the CPU 61 sets a cut position C at the border of the two print data P having been arranged so as to adjoin to each other at the identical data arrangement process (S6). The cut position C herein corresponds to a position where the tape is cut off by the cutter unit 25 (namely, the full-cut unit 30 or the half-cut unit 35) in the course of printing a group of print data P. It is to be noted that the CPU 61 sets a cut position C at the front edge border Ef of the print data P to be initially printed out in the group and a cut position C at the back edge border Eb of the print data P to be finally printed out in the group. After completion of the cut position setting process (S7), the CPU 61 shifts the process to S8.

At S8, the CPU 61 executes a print and cut process. At the print and cut process (S8), the CPU 61 carries out print of the group of print data P arranged at the identical data arrangement process (S6) one by one and cuts off the tape T at each cut position C set at the cut position setting process (S7). After completion of the print and cut process (S8), the CPU terminates the main control program.

In a case where the number of print data P is 1 (S2: NO) and the process is consequently shifted to S8, the CPU 61 sets two cut positions C, namely, at a front edge border Ef and a back edge border Eb of a single print data P. After that, the CPU 61 carries out print in accordance with the single print data P and cuts off the tape T at the two cut positions C directed to the front edge border Ef and the back edge border Eb.

Figure 10:
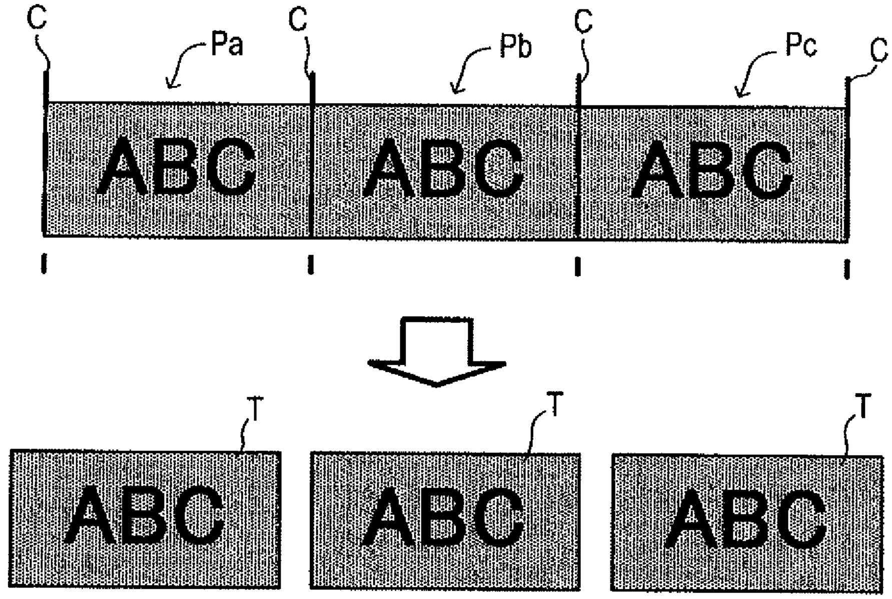
FIG. 10 is a diagram for illustrating details of steps to follow an identical data arrangement process.

Here will be described on details about a case that print is carried out on the tape T along steps to follow the identical data arrangement process (S6), by referring to FIG. 10. It is to be noted that, in the case shown in FIG. 10, the first print data Pa, the second print data Pb and the third print data Pc are print data expressing identical mono-colored background (e.g., mono-colored background of "magenta").

In this case, at the identical data arrangement process (S6), the CPU 61 arranges the second print data Pb so that the front edge border Ef thereof adjoins to the back edge border Eb of the first print data Pa, and further arranges the third print data Pc so that the front edge border Ef adjoins to the back edge border Eb of the second print data Pb. At the cut position setting process (S7), the CPU 61 sets a cut position C at the border of the first print data Pa and the second print data Pb and another cut position C at the border of the second print data Pb and the third print data Pc. The CPU 61 also set a cut position C at the front edge border Ef of the first print data Pa and another cut position C at the back edge border Eb of the third print data Pc.

Shifting the process to the print and cut process (S8), the CPU 61 carries out full-color print on the tape T in accordance with the first print data Pa through third print data Pc and duly cuts off the tape T at cut positions C set at the cut position setting process (S7) by using the cutter unit 25. Thereby, the tape printing apparatus 1 is capable of outputting print results in accordance with the first print data Pa, the second print data Pb and the third print data Pc without color mixture. It is to be noted that a user can obtain labels cut off by length respectively set for the first print data Pa, the second print data Pb and the third print data Pa.

Figure 11:
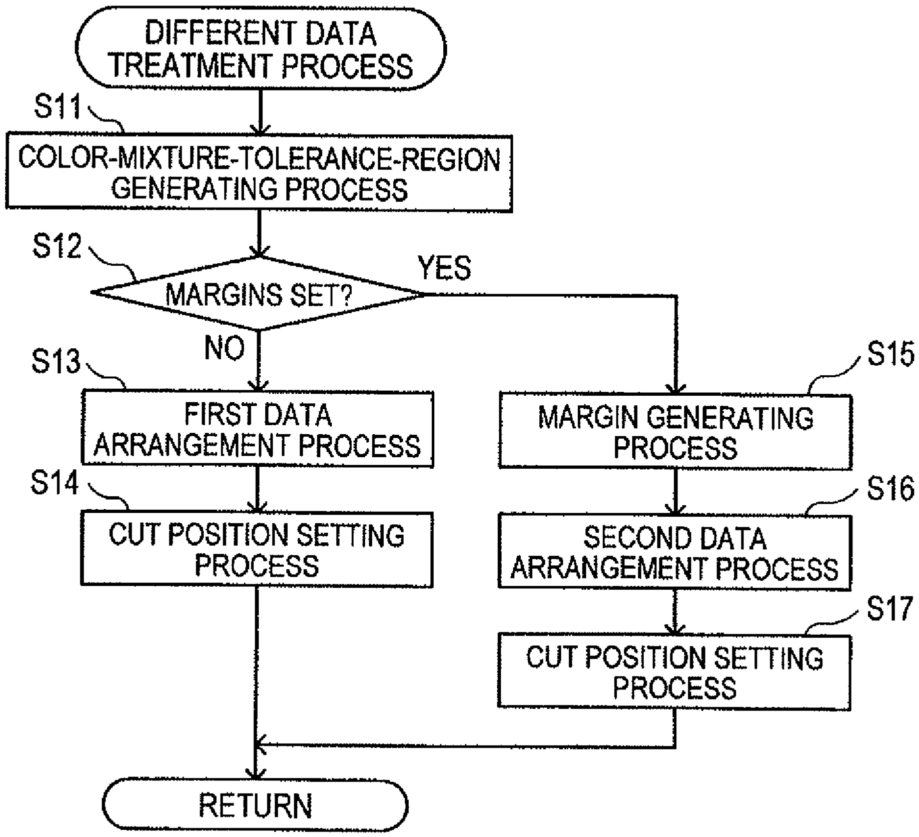
FIG. 11 is a flowchart of a different data treatment process program.

Next, there will be described on the details about a different data treatment process program to be executed at the different data treatment process (S5) by referring to FIG. 11. Shifting the process to the different data treatment process (S5), the CPU 61 firstly executes a color-mixture-tolerance-region generating process (S11) with respect to two print data P detected as having difference at a back-side background region Bb directed to former one of the two print data P and a front-side background region Bf of the latter one of the two print data P. At the color-mixture-tolerance region generating process (S11), with respect to the print data P to be first printed out in the two print data P, the CPU 61 generates a back-side color mixture tolerance region Mb in accordance with a back-side background region Bb thereof and the CPU 61 also generates a front-side color mixture tolerance region Mf in accordance with a front-side background region Bf thereof. Further, with respect to the print data P to be next printed out in the two print data P, the CPU 61 generates a front-side color mixture tolerance region Mf in accordance with a front-side background region Bf thereof and the CPU 61 also generates a back-side color mixture tolerance region Mb in accordance with a back-side background region Bb thereof. After completion of the color-mixture-tolerance-region generating process (S11), the CPU 61 shifts the process to S12.

Figure 12:
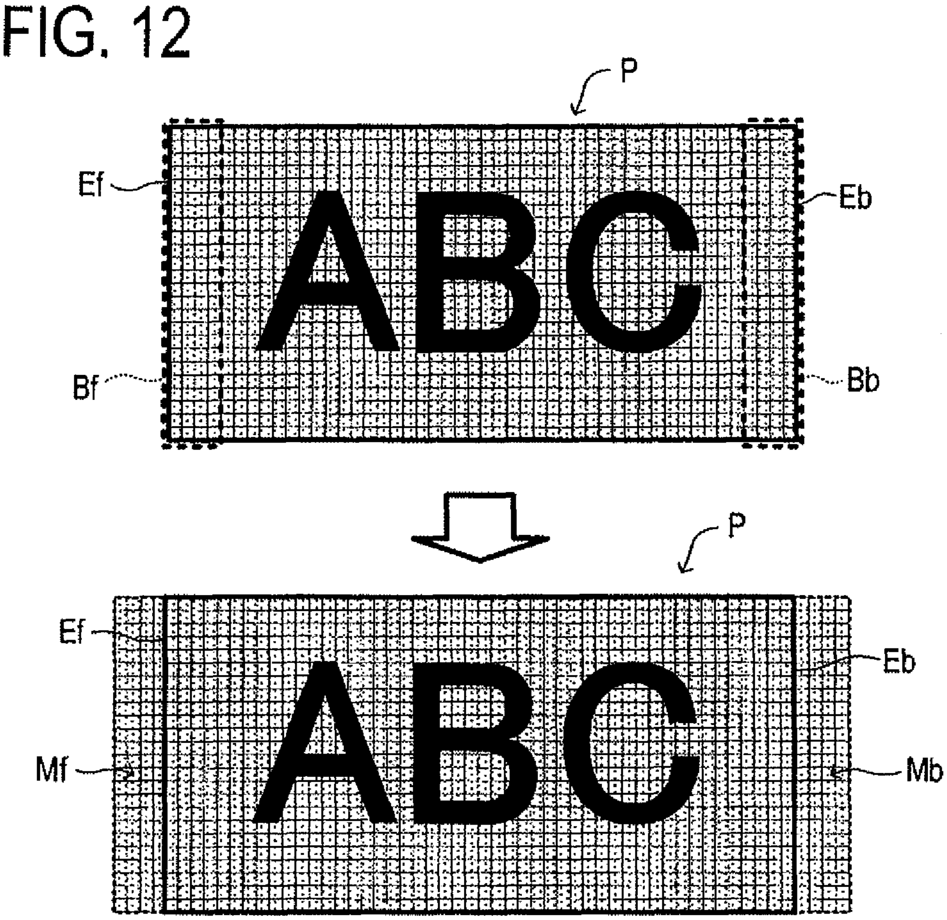
FIG. 12 is a diagram for illustrating details of a color-mixture-tolerance-region generating process.

Here will be described on detailed process contents of the color-mixture-tolerance-region generating process (S11) by referring to FIG. 12. Here will be taken a specific example of a color-mixture tolerance region generating process (S11) to be applied to a case of print data P expressing mono-colored background of "magenta". As shown in FIG. 12, the front-side background region Bf of the print data P is comprised of plural line data consisting of dot data to be printed in magenta. Accordingly, at the color-mixture-tolerance region generating process (S11), the CPU 61 generates plural line data expressing mono-colored background of magenta in accordance with the configuration of the front-side background region Bf, and adds the plural line data immediately before the front edge border Ef as front-side color mixture tolerance region Mf (refer to FIG. 12). The CPU 61 generates plural line data expressing magenta in accordance with the back-side background region Bb, and further adds the plural line data immediately after the back edge border Eb as back-side color mixture tolerance region Mb to be printed out subsequent to the back-side background region Bb of the print data P. Thereby, the print data P looks to extend frontward and backward naturally owing to addition of the front-side color mixture tolerance region Mf and the back-side color mixture tolerance region Mb.

As described in the above, the tape printing apparatus 1 of the present embodiment is capable of printing out various background patterns such as dot patterns and stripe patterns (including vertical, horizontal and oblique stripes) in accordance with print data P. The above such background patterns are constituted by repeatedly arranging a unit of a background pattern made of single or plural line data. Accordingly, in a case where the background of the print data P is comprised of a background pattern, the CPU 61 detects configuration of the front-side background region Bf and that of the back-side background region Bb so as to specify configuration of plural line data constituting the background pattern to continue to the front-side background region Bf and those to continue to the back-side background region Bb. Based on the thus specified plural line data, the front-side color mixture tolerance region Mf and the back-side color mixture tolerance region Mb can be additionally arranged. Thereby, in a case where the background of the print data P is a background pattern and the color-mixture-tolerance region generating process (S11) is applied thereto, the background pattern of the print data P looks to extended frontward and backward naturally owing to addition of the front-side color mixture tolerance region Mf and the back-side color mixture tolerance region Mb.

In the present embodiment, plural line data are additionally arranged so as to generate a front-side color mixture tolerance region Mf and a back-side color mixture tolerance region Mb but the method of generating color mixture tolerance regions is not restricted to this manner. For instance, when printing out line data of a front-side background region Bf and that of a back-side background region Bb, a print cycle may be made longer with respect to one line of print data so as to enlarge a print area of the front-side background region Bf and that of the back-side background region Bb; a part of the enlarged print area of the front-side background region Bf can be a front-side color mixture tolerance region Mf and that of the enlarged print area of the back-side background region Bf can be a back-side color mixture tolerance region Mb.

Reverting to FIG. 11, process contents to follow the S11 will be described. At S12, the CPU 61 determines whether or not margin setting is made valid with respect to the to-be outputted group of print data P. Margin setting means arranging margins at a predetermined area before the front edge border Ef and at a predetermined area after the back edge border Eb when each print data P is outputted from the tape printing apparatus 1 and specific operation with the tape printing apparatus 1 can allows change of margin setting. In a case where margin setting is made valid (S12: YES), the CPU 61 shifts the process to S15. In a case where margin setting is not made valid (S12: NO), the CPU 61 shifts the process to S13.

At S13, the CPU 61 executes a first data arrangement process with respect to two print data P for each of which a front-side color mixture tolerance region Mf and a back-side color mixture tolerance region Mb have been generated at the color-mixture-tolerance-region generating process (S11) as comparison result at the two-background-regions comparison process (S3) in which difference has been detected between configuration of a back-side background region Bb directed to one of the two print data P and that of the a front-side background region Bf of the other one of them. For instance, in a case where background configuration of a back-side background region Bb directed to first print data Pa and that of a front-side background region Bf directed to second print data Pb are different, the CPU 61 continuously arranges the six kinds of to-be-printed objects in the following order (refer to the upper illustration of FIG. 13): (1) a front-side color mixture tolerance region Mf directed to the first print data Pa; (2) the first print data Pa; (3) a back-side color mixture tolerance region Mb directed to the first print data Pa; (4) a front-side color mixture tolerance region Mf directed to the second print data Pb; (5) the second print data Pb; and (6) a back-side color mixture tolerance region Mb directed to the second print data Pb. After completion of the first data arrangement process (S13), the CPU 61 shifts the process to S14.

Figure 13:
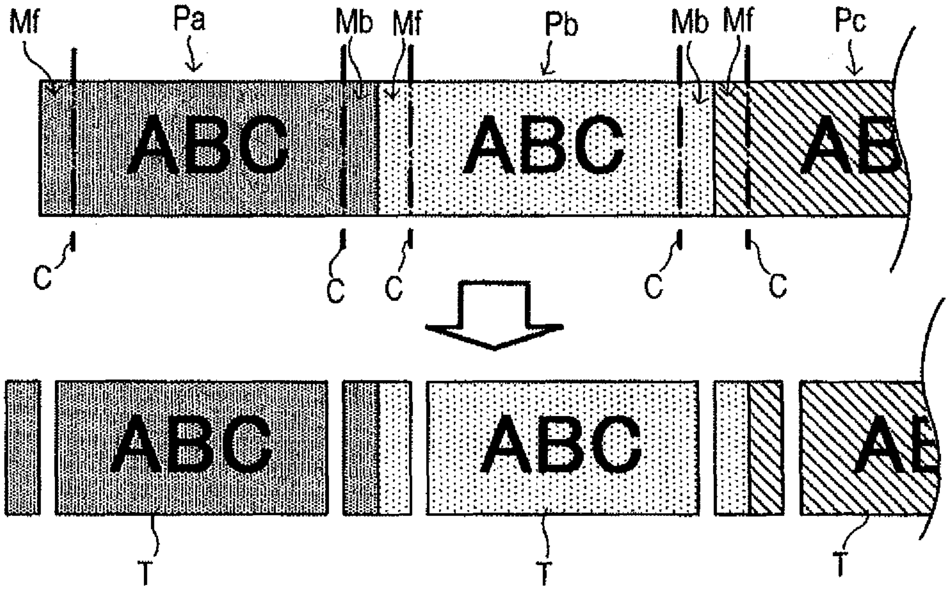
FIG. 13 is a diagram for illustrating details of steps to follow a first data arrangement process.

Shifting the process to S14, the CPU 61 executes a cut position setting process with respect to the print data P arranged at the first data arrangement process (S13). At the cut position setting process (S14), the CPU 61 sets cut positions C at a front edge border Ef and a back edge border Eb of the respective print data P. Specifically, as shown in FIG. 13, cut positions C are set at a position where a font-side color mixture tolerance region Mf and a front edge border Ef of print data P adjoin to each other and a position where a back edge border Eb of the print data P and a back-side color mixture tolerance region Mb adjoin to each other. After completion of the cut position setting process (S14), the CPU 61 terminates the different data treatment process program and shifts the process to the print and cut process (S8) of the main control program.

At S15 to which the process is shifted in a case where margin setting is made valid (S12: YES), the CPU 61 executes a margin generating process. Specifically, the CPU 61 adds front margin data before a front edge portion of a front-side color mixture tolerance region Mf of each print data P and back margin data after a back-side color mixture tolerance region Mb of each print data P, both the front margin data and the back margin data expressing predetermined length of margin. Thereby, a margin space Sp in a merged form of a front margin and a back margin is formed between a back-side color mixture tolerance region Mb directed to print data P to be printed out earlier and a front-side color mixture tolerance region Mf directed to print data P to be printed out next (refer to FIG. 14). After completion of the margin generating process (S15), the CPU 61 shifts the process to S16.

At S16, the CPU 61 executes a second data arrangement process with respect to two print data P for each of which a front-side color mixture tolerance region Mf, a back-side color mixture tolerance region Mb, a front margin and a back margin have been generated as comparison result at the two-background-regions comparison process (S3) in which difference has been detected between configuration of back-side background region Bb directed to one of the two print data P and that of the a front-side background region Bf of the other one of them. For instance, in a case where background configuration of a back-side background region Bb directed to first print data Pa and that of a front-side background region Bf directed to second print data Pb are different, the CPU 61 continuously arranges the seven kinds of to-be-printed objects in the following order (refer to the upper illustration of FIG. 14); (1) a front-side color mixture tolerance region Mf directed to the first print data Pa; (2) the first print data Pa; (3) a back-side color mixture tolerance region Mb directed to the first print data Pa; (4) a margin space Sp consisting of a back margin directed to the first print data Pa and a front margin directed to the second print data Pb; (5) a front-side color mixture tolerance region Mf directed to the second print data Pb; (6) the second print data Pb; and (7) a back-side color mixture tolerance region Mb directed to the second print data Pb. After completion of the second data arrangement process (S16), the CPU 61 shifts the process to S17.

Figure 14:
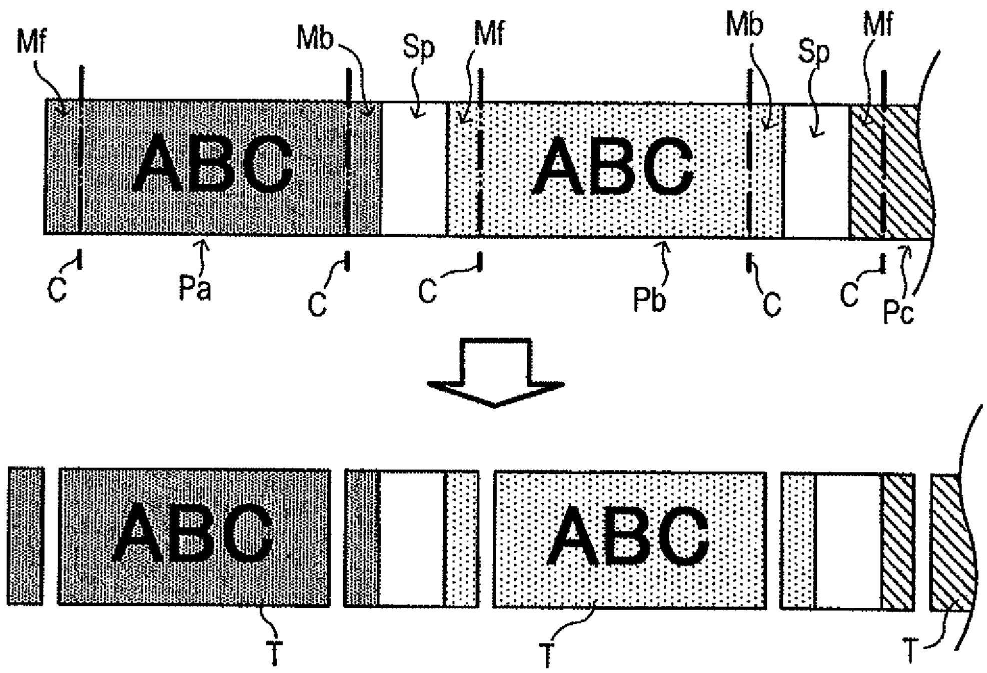
FIG. 14 is a diagram for illustrating details of steps to follow a second data arrangement process.

Shifting the process to S17, the CPU 61 executes a cut position setting process with respect to the print data P arranged at the second data arrangement process (S16). At the cut position setting process (S17), the CPU 61 sets cut positions C at a front edge border Ef and a back edge border Eb of the respective print data P. Specifically, as shown in FIG. 14, cut positions C are set at a position where a font-side color mixture tolerance region Mf and a front edge border Ef of print data P adjoin to each other and a position where a back edge border Eb of the print data P and a back-side color mixture tolerance region Mb adjoin to each other. After completion of the cut position setting process (S17), the CPU 61 terminates the different data treatment process program and shifts the process to the print and cut process (S8) of the main control program.

Next, there will be described on details about a case that print is carried out on the tape T along steps to follow the first data arrangement process (S13), by referring to FIG. 13. It is to be noted that, in the case shown in FIG. 13, the first print data Pa, the second print data Pb and the third print data Pc are print data expressing different mono-colored backgrounds. Specifically, the first print data Pa is specified by mono-colored background of "magenta", the second print data Pb is specified by that "yellow" and the third print data Pc is specified by that of "cyan".

In that case, as shown at the upper illustration of FIG. 13, through the first data arrangement process (S13), there are continuously arranged the nine kinds of to-be-printed objects in the following order: (1) a front-side color mixture tolerance region Mf directed to the first print data Pa; (2) the first print data Pa; (3) a back-side color mixture tolerance region Mb directed to the first print data Pa; (4) a front-side color mixture tolerance region Mf directed to the second print data Pb; (5) the second print data Pb; (6) a back-side color mixture tolerance region Mb directed to the second print data Pb; (7) a front-side color mixture tolerance region Mf directed to the third print data Pc; (8) the third print data Pc; and (9) a back-side color mixture tolerance region Mb directed to the third print data Pc. At the cut position setting process (S14), two cut positions C are set for each of respective print data Pa, Pb, and Pc, namely, the front edge border Ef and the back edge border Eh of the first print data Pa, the front edge border Ef and the back edge border Eb of the second print data Pb, and the front edge border Ef and the back edge border Eb of the third print data Pc (refer to the upper illustration).

Shifting the process to the print and cut process (S8), by controlling the printer unit 20 and the cutter unit 26, the CPU 61 carries out print of the first print data Pa through the third print data Pc in accordance with data arrangement order made at the first data arrangement process (S13) and cuts off the tape T at each cut position C set at the cut position setting process (S14).

As described, the first print data Pa, the second print data Pb and the third print data Pc are continuously printed out on the tape T so that the back-side color mixture tolerance region Mb of the first print data Pa adjoins the front-side color mixture tolerance region Mf of the second print data Pb as well as the back-side color mixture tolerance region Mb of the second print data Pb adjoins the front-side color mixture tolerance region Mf of the third print data Pc. Accordingly, color mixture due to difference of background expressions occurs at an region where a front-side color mixture tolerance region and a back-side color mixture tolerance region adjoin to each other but not occur at resultant printed regions corresponding to the first print data pa, the second print data Pb and the third print data Pc (refer to the lower illustration of FIG. 13). Consequently, the tape printing apparatus 1 is capable of serving a label printed in accordance with borderless print without color mixture therein even if plural print data P different in their background expression are continuously printed out on the tape T.

Further, as shown in FIG. 13, the tape printing apparatus 1 cuts off the tape T at positions corresponding to their respective original front-side and back-side border portions of the first print data Pa, the second print data Pb and the third print data Pc. Accordingly, the tape printing apparatus 1 is capable of serving a label created in accordance with borderless print at user's desired size without cutting the label at size shorter than user's desired size. Even though an actual cut position deviates from its primary cut position C due to tolerance of the cut control, the actual cut position surely is located so as to fall within any one of them, namely, print data P, a front-side color mixture tolerance region Mf or a back-side color mixture tolerance region Mb and the resultant label does not include not-printed portion or the like. To sum up, the tape printing apparatus 1 is capable of serving a label with a natural background expression no matter how the label may be cut and served.

Next, there will be described in detail with respect to a case where print is carried out on the tape T through the margin generating process (S16) and the second data arrangement process (S18) by referring to FIG. 14. Here, the above case will be described by taking the specific example of print data P already mentioned in the first data arrangement process (S13).

As shown in the upper illustration of FIG. 14, through the second data arrangement process (S16), there are continuously arranged the eleven kinds of to-be-printed objects in the following order: (1) a front-side color mixture tolerance region Mf directed to the first print data Pa; (2) the first print data Pa; (3) a back-side color mixture tolerance region Mb directed to the first print data Pa; (4) a margin space Sp for the first print data Pa and the second print data Pb; (5) a front-side color mixture tolerance region Mf directed to the second print data Pb; (6) the second print data Pb; (7) a back-side color mixture tolerance region Mb directed to the second print data Pb; (8) a margin space Sp for the second print data Pb and the third print data Pc; (9) a front-side color mixture tolerance region Mf directed to the third print data Pc; (10) the third print data Pc; and (11) a back-side color mixture tolerance region Mb directed to the third print data Pc. At the cut position setting process (S17), two cut positions C are set for each of respective print data Pa, Pb, and Pc, namely, the front edge border Ef and the back edge border Eb of the first print data Pa, the front edge border Ef and the back edge border Eb of the second print data Pb, and the front edge border Ef and the back edge border Eb of the third print data Pc (refer to the upper illustration of FIG. 14).

Shifting the process to the print and cut process (S8), by controlling the printer unit 20 and the cutter unit 25, the CPU 61 carries out print of the first print data Pa through the third print data Pc in accordance with the arrangement order made at the second data arrangement process (S16) and cuts off the tape T at each cut position C set at the cut position setting process (S17).

As described, the first print data Pa, the second print data Pb and the third print data Pc are continuously printed on the tape T so that two of margin spaces Sp are inserted between the back-side color mixture tolerance region Mf of the first print data Pa and the front-side color mixture tolerance region Mb of the second print data Pb, and also between the back-side color mixture tolerance region Mf of the second print data Pb and the front-side color mixture tolerance region Mb of the third print data Pc. Accordingly, color mixture due to difference of background expressions does not occur owing to arrangement of the margin space Sp. Therefore, color mixture does not occur at resultant printed regions corresponding to the first print data Pa, the second print data Pb and the third print data Pc (refer to the lower illustration of FIG. 14). Consequently, the tape printing apparatus 1 is capable of serving a label printed in accordance with borderless print without color mixture therein even if plural print data P different in their background expression are continuously printed on the tape T.

Further, as shown in FIG. 14, the tape printing apparatus 1 cuts off the tape T at positions corresponding to their respective original front-side and back-side border portions of the first print data Pa, the second print data Pb and the third print data Pc. Accordingly, the tape printing apparatus 1 is capable of serving a label created in accordance with borderless print at user's desired size without cutting the label at size shorter than the user's desired size. Even though an actual cut position deviates from its primary cut position C due to tolerance of the cut control, the actual cut position is surely located so as to fall within any one of them, namely, print data P, a front-side color mixture tolerance region Mf or a back-side color mixture tolerance region Mb and the resultant label does not include not-printed portion or the like. To sum up, the tape printing apparatus 1 is capable of serving a label with a natural background expression no matter how the label may be cut and served.

By using the half-cut unit 35, the tape printing apparatus 1 is capable of half-cutting the tape T at a cut position C. Accordingly, the tape printing apparatus 1 is capable of serving a label printed color-mixture free and borderless at desired size for user's convenience.

It is to be noted that the present disclosure is not restricted to aspects of embodiments described herein and that various changes and modification may be made without departing from the gist of the present disclosure. For instance, the tape printing apparatus 1 in the embodiment uses the tape T configured to thermally develop colors for full-color print, manner of full-color print is not restricted to this. For instance, full-color print may be carried out by using ink ribbons of magenta, yellow and cyan.

What is claimed is:

1. A tape printing apparatus comprising:

a print data inputting unit that allows an input of print data containing a background content that involves designation of a background color to be used for entirety of a print region;

a printing unit that carries out full-color print on a tape having long length in accordance with the print data inputted with the print data inputting unit; and a cutting unit that cuts the tape along width direction thereof, wherein the tape printing apparatus further includes:

a data accepting unit that accepts an input of first print data and an input of second print data both inputted by the print data inputting unit, the first print data being data to be firstly printed out by the printing unit and the second print data being data to be printed out by the printing unit next to the first print data;

a difference detecting unit that detects whether or not there is difference between a background content of a first region directed to the first print data and a background content of a second region directed to the second print data, the first region being a predetermined range including a back edge border to be printed out last in the first print data by the printing unit and the second region being a predetermined range including a front edge border to be printed out first in the second print data by the printing unit;

a color-mixture-tolerance-region generating unit that generates a first color mixture tolerance region and a second color mixture tolerance region in a case where the difference detecting unit detects difference between the background content of the first region and the background content of the second region, the first color mixture tolerance region being a region to be printed out immediately after the back edge border of the first print data in accordance with the background content of the first region and the second color mixture tolerance region being a region to be printed out immediately before the front edge border of the second print data in accordance with the background content of the second region;

a cut position setting unit that sets on the tape cut positions where the tape is cut by the cutting unit, the cut positions being a front edge border and the back edge border of the first print data and the front edge border and a back edge border of the second print data;

a print control unit that controls the printing unit so as to print out on the tape in order of the first print data, the first color mixture tolerance region, the second color mixture tolerance region and the second print data; and a cut control unit that controls the cutting unit so as to cut at the cutting positions set by the cut position setting unit, the tape on which the printing unit has carried out print.

2. The tape printing apparatus according to claim 1, wherein the print control unit controls the printing unit so that the first color mixture tolerance region and the second color mixture tolerance region are printed out continuously, by printing out a front edge portion of the second mixture tolerance region immediately after a back edge portion of the first mixture tolerance region.

3. The tape printing apparatus according to claim 1 further comprising a margin setting unit that sets presence and absence of a margin to be formed at two of longitudinal directional outsides of a print result of the print data on the tape, wherein, in a case where the margin setting unit sets a margin, the print control unit controls the printing unit so as to form the margin immediately after a back edge portion of the first mixture tolerance region and subsequently print out a front edge portion of the second color mixture tolerance region.

4. The tape printing apparatus according to claim 1, wherein, in a case where the difference detecting unit detects that the background content of the first region and the background content of the second region are identical with each other, the print control unit controls the printing unit so as to print out in order of the first print data and the second print data while a border portion in common with the back edge border of the first print data and the front edge border of the second print data is generated, and the cut position setting unit sets a cut position at the border portion.

5. The tape printing apparatus according to claim 2, wherein, in a case where the difference detecting unit detects that the background content of the first region and the background content of the second region are identical with each other, the print control unit controls the printing unit so as to print out in order of the first print data and the second print data while a border portion in common with the back edge border of the first print data and the front edge border of the second print data is generated, and the cut position setting unit sets a cut position at the border portion.

6. The tape printing apparatus according to claim 3, wherein, in a case where the difference detecting unit detects that the background content of the first region and the background content of the second region are identical with each other, the print control unit controls the printing unit so as to print out in order of the first print data and the second print data while a border portion in common with the back edge border of the first print data and the front edge border of the second print data is generated, and the cut position setting unit sets a cut position at the border portion.

7. The tape printing apparatus according to claim 1, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

8. The tape printing apparatus according to claim 2, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

9. The tape printing apparatus according to claim 3, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

10. The tape printing apparatus according to claim 4, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

11. The tape printing apparatus according to claim 5, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

12. The tape printing apparatus according to claim 6, wherein the tape includes:

a label consisting of a printing surface that allows the printing unit to print out thereon, and an adhesive surface that is arranged at a reverse side of the printing surface and formed of an adhesive layer; and a release sheet that is pasted so as to cover the adhesive surface of the label, and wherein the cutting unit is capable of half-cutting the tape at the cut positions set by the cut position setting unit so that the label is cut off and the release sheet is left uncut.

* * * * *